(12) United States Patent
Hoffmann

(10) Patent No.: US 7,323,113 B2
(45) Date of Patent: Jan. 29, 2008

(54) PATTERN TRANSFER WITH SELF-SIMILAR SACRIFICIAL MASK LAYER AND VECTOR MAGNETIC FIELD SENSOR

(75) Inventor: Axel Hoffmann, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 521 days.

(21) Appl. No.: 10/980,507

(22) Filed: Nov. 3, 2004

(65) Prior Publication Data

US 2005/0111146 A1 May 26, 2005

Related U.S. Application Data

(60) Provisional application No. 60/523,596, filed on Nov. 20, 2003, provisional application No. 60/523,590, filed on Nov. 20, 2003.

(51) Int. Cl.
*B44C 1/22* (2006.01)
(52) U.S. Cl. .................. 216/22; 216/40; 360/324.2
(58) Field of Classification Search .............. 216/22, 216/40; 360/324.2
See application file for complete search history.

(56) References Cited

U.S. PATENT DOCUMENTS

| | | | |
|---|---|---|---|
| 6,174,801 B1 * | 1/2001 | Tzu et al. ............ | 438/637 |
| 2003/0039078 A1 * | 2/2003 | Li et al. .............. | 360/314 |
| 2003/0219973 A1 * | 11/2003 | Townsend et al. ...... | 438/631 |
| 2004/0080873 A1 * | 4/2004 | Shintani et al. ....... | 360/324.1 |

OTHER PUBLICATIONS

A. Hoffmann, M. Grimsditch, J.E. Pearson, J. Nogues, W.A.A. Macedo, and Ivan K. Schuller "Tailoring the exchange bias via shape anisotropy in ferromagnetic/antiferromagnetic exchange-coupled systems", Physical Review B 67, 220406 (R) (2003), pp. 67 220406-1-67 220406-4 (Jun. 26, 2003).
A. Hoffmann, M. Grimsditch, J.E. Pearson, J. Nogues, W.A.A. Macedo, and Ivan K. Schuller "Tailoring the exchange bias via shape anisotropy" PACS numbers: 2001 PACS 75.75.+a, 75.70.Cn, 75.60.Ej (Dec. 16, 2002).

* cited by examiner

*Primary Examiner*—Nadine Norton
*Assistant Examiner*—Dahimene Mahmoud
(74) *Attorney, Agent, or Firm*—Joan Pennington

(57) ABSTRACT

A method is provided for producing a lithographic pattern using a mask that includes the same materials as the material to be etched, allowing the pattern to be transferred and the etch mask to be removed in one step. In accordance with features of the invention, the method includes building up of a layer or layers of material of specific thickness on top of a substrate so that temporal control of an etching process allows formation of the desired pattern. Different exchange bias directions can be established by the use of shape anisotropy for the exchange biased component of a spin valve device. This enables several different magnetic reference directions to be present on a single chip, which allows a more compact magnetic field sensor to be developed. In accordance with features of the invention, different field directions are established on one single chip by using shape anisotropy.

8 Claims, 14 Drawing Sheets

PATTERN TRANSFER WITH SELF-SIMILAR SACRIFICIAL MASK LAYER AND VECTOR MAGNETIC FIELD SENSOR

This application claims the benefit of U.S. Provisional Application No. 60/523,590, filed on Nov. 20, 2003 and U.S. Provisional Application No. 60/523,596, filed on Nov. 20, 2003.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a method for producing a lithographic pattern using a mask which consists of the same materials as the material to be etched, allowing the pattern to be transferred and the etch mask to be removed in one step and a vector magnetic field sensor defined by a single chip sensor upon which different magnetic reference directions have been established that allows the measurement of the direction and magnitude of an external magnetic field.

DESCRIPTION OF THE RELATED ART

One of the major steps in the manufacture of nanometer scale devices involves the transfer of a pattern into a multi-layered thin film structure. The most commonly used method of doing this involves several steps. First, an etch mask using a lithographic process is generated and applied to the appropriate substrate. Then the pattern is transferred to the desired substrate, often by directional etching. At this point, in many cases the mask must be removed using a selective chemical etching process. As the material and chemicals used in this step need to be optimized for every material in the multilayered film, choice of suitable reagents can be a formidable task.

Some of the most sensitive magnetic field sensors available today are spin-valve devices. In such devices a reference magnetic field direction is established through exchange biasing due to the coupling between a ferromagnet and an antiferromagnet. Ordinarily, the reference direction of the exchange biased component is determined during the manufacturing process, either due to magnetic field cooling or due to preparation within a magnetic field, and is unidirectionally fixed for each chip. Therefore in order to measure the different components of a magnetic field, sensors having separate chips with different magnetic reference directions must be used.

Important objects of the present invention are to provide a method for producing a lithographic pattern using a mask which consists of the same materials as the material to be etched, allowing the pattern to be transferred and the etch mask to be removed in one step and an improved mechanism to measure the different components of a magnetic field.

SUMMARY OF THE INVENTION

In brief, a method is provided for producing a lithographic pattern using a mask that includes the same materials as the material to be etched, allowing the pattern to be transferred and the etch mask to be removed in one step.

In accordance with features of the invention, the method includes building up of a layer or layers of material of specific thickness on top of a substrate so that temporal control of an etching process allows formation of the desired pattern.

In accordance with features of the invention, different exchange bias directions can be established by the use of shape anisotropy for the exchange biased component of the spin valve device. This enables several different magnetic reference directions to be present on a single chip, which allows a more compact magnetic field sensor to be developed. A single chip sensor upon which different magnetic reference directions have been established allowing the measurement of an external magnetic field defines a vector magnetic field sensor of the invention.

In accordance with features of the invention, different field directions are established on one single chip by using shape anisotropy.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
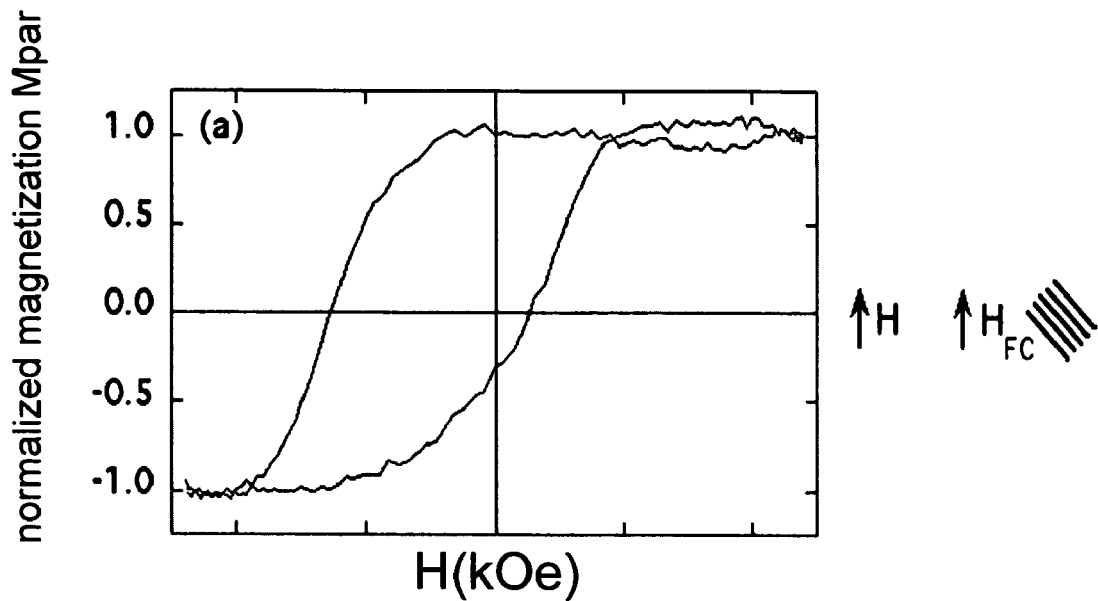
FIGS. 1A, 1B, 1C, 1D, 1E, and 1F illustrate magnetic hysteresis loops of line patterns measured with magneto-optic Kerr effect (MOKE) using an optical cryostat.

The magnetic behavior of Fe lines on top of a continuous $FeF_2$ antiferromagnetic layer was investigated as a function of the orientation of the lines with respect to the applied magnetic field and a unidirectional anisotropy established by field cooling. The orientational dependence of the asymmetric loop shift, called exchange bias, shows that the competition between shape and unidirectional anisotropies modifies the exchange bias and the coercivity. Remarkably, in certain cases, exchange bias can be observed even when the applied field is perpendicular to the unidirectional anisotropy. Numerical simulations with a coherent rotation model illustrate a rich phase diagram, which originates from the noncollinearity of the involved anisotropies. Using this phase diagram, exchange bias and coercivity can be predictably tailored. In particular, different preferred magnetization directions can be designed in separately patterned structures of the same sample with identical preparation and magnetic history.

Although the role of shape anisotropy in homogeneous magnetic materials has been well understood for a long time, it is shown here that adding shape anisotropy to magnetic heterostructures can give rise to an unexpected behavior due to a competition between shape anisotropy and internal interactions of the heterostructure. Examples of heterostructures, which received much attention lately, are ferromagnetic/antiferromagnetic exchange-coupled systems. The coupling between an antiferromagnet and a ferromagnet can give rise to an induced unidirectional anisotropy in the ferromagnet, which is referred to as exchange bias. The main characteristic of this induced anisotropy is a shift of the hysteresis loop of the ferromagnet along the field axis. This unidirectional anisotropy stems presumably from the way the antiferromagnet orders in the proximity of a ferromagnet, but a detailed understanding is still missing. Regardless of the missing microscopic understanding, exchange bias has become important for many magnetoelectronic applications, because it pins the magnetization orientation of one ferromagnetic layer, which then serves as the reference layer in a variety of device structures, such as spin valves and magnetic memory elements.

For applications, it is often necessary to pattern the heterostructures into a confined geometry. Thus the question of how patterning influences the magnetic behavior arises naturally. Up to now, studies of exchange-biased antiferromagnetic/ferromagnetic wires have been restricted to cases with shape anisotropy either parallel or perpendicular to the applied magnetic field. These studies showed a modified exchange bias similar to nanostructured networks of exchange-bias systems. However, there has been no systematic study of the role of the shape anisotropy orientation and no quantitative understanding of these effects has yet been obtained.

In this work, the exchange bias of Fe lines on an antiferromagnetic $FeF_2$ film was studied as a function of line orientation with respect to cooling and applied magnetic fields, but fixed with respect to the $FeF_2$ crystalline orientations. The main result is that competition and noncollinearity between unidirectional exchange coupling and shape anisotropy can give rise to an unexpected magnetic behavior. This opens up a straightforward pathway to tailor both the magnitude and direction of exchange bias, which can be applied to any exchange-bias system. We compare the experimental results to numerical simulations obtained from a coherent rotation model. The simulations give rise to a surprisingly rich variety of hysteretic behavior. The magnetic behavior depends strongly on the ratio and relative orientation between shape and uniaxial anisotropies. In particular, when the ratio is less than 1, large exchange bias is observed even with magnetic fields applied perpendicular to the unidirectional anisotropy. This permits the introduction of several different preferred magnetization directions in separately patterned structures, independent from material specific parameters, even if they have identical magnetic history.

Using the new patterning technique, which is described in more detail below, we defined 300-nm-wide polycrystalline Fe lines on top of a continuous quasiepitaxial (110) $FeF_2$ film grown on a MgO (100) substrate. The $FeF_2$ and Fe are 90 and 10 nm thick, respectively. The Fe lines have a periodicity of 500 nm and cover several 100×100-μm² areas, each with a different direction with respect to the MgO [010] direction. Since all the patterns are on one single chip, it is assured that the local exchange interaction between the Fe lines and $FeF_2$ film and the magnetic history (i.e., magnitude and direction of the cooling field) are identical for all patterns.

The magnetic hysteresis loops of the line patterns were measured with magneto-optic Kerr effect (MOKE), using an optical cryostat. The transverse MOKE geometry is used under ~45° incidence, which allows us to measure the magnetization component Mpar parallel to the applied field. The laser beam is focused down to 50 mm diameter, which enables us to address each of the Fe-line patterns individually. Magnetic hysteresis loops measured at room temperature for the patterned Fe lines along various directions are consistent with a uniaxial shape anisotropy $K_u$=150 Oe.

Figure 1B:
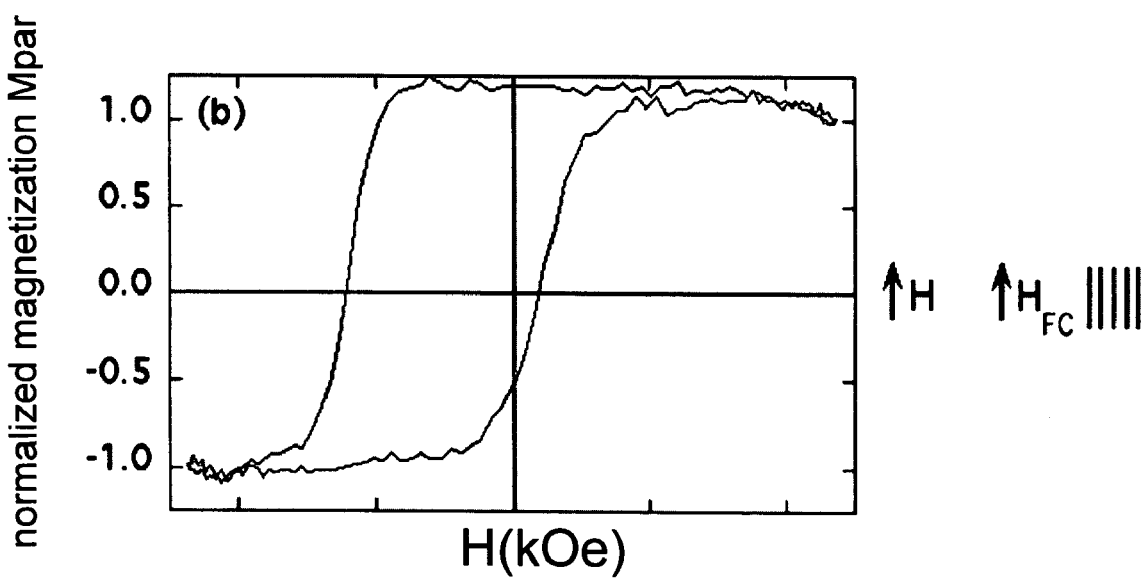
Figure 1C:
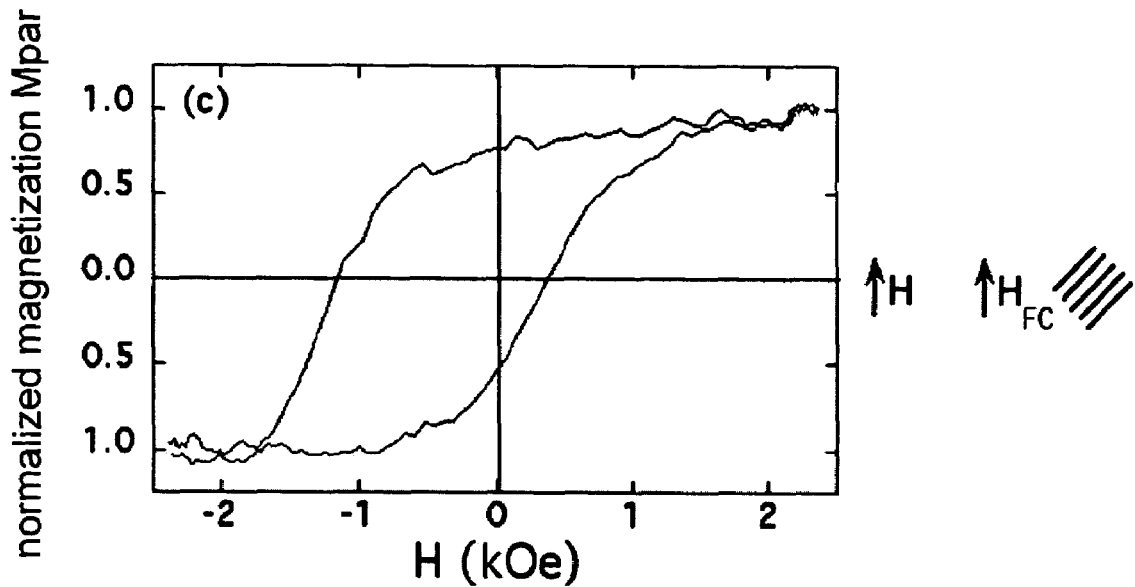
Figure 1D:
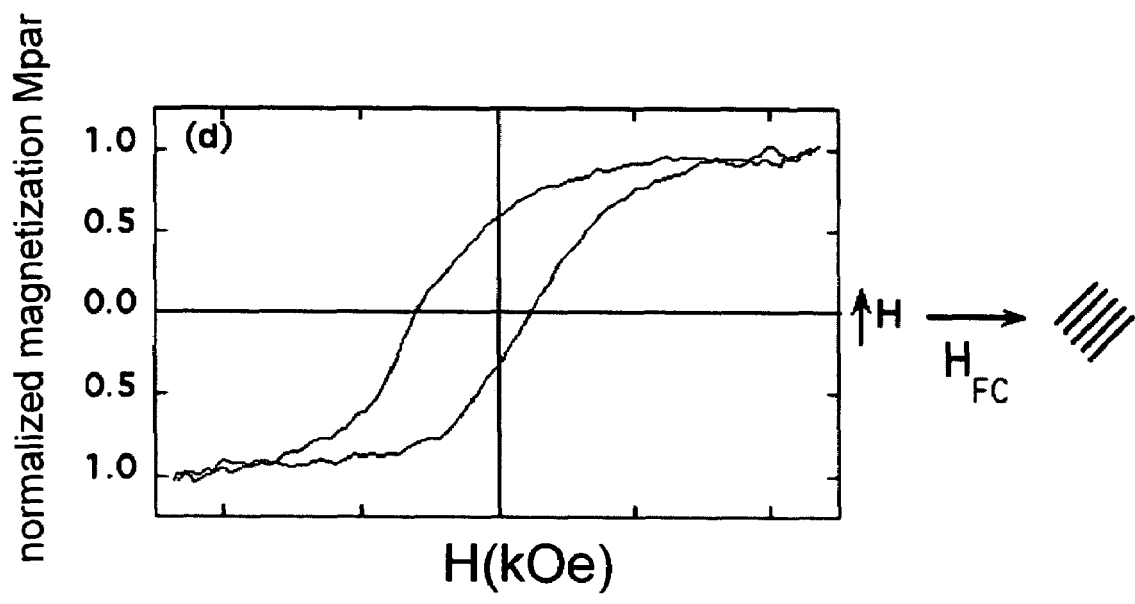
Figure 1E:
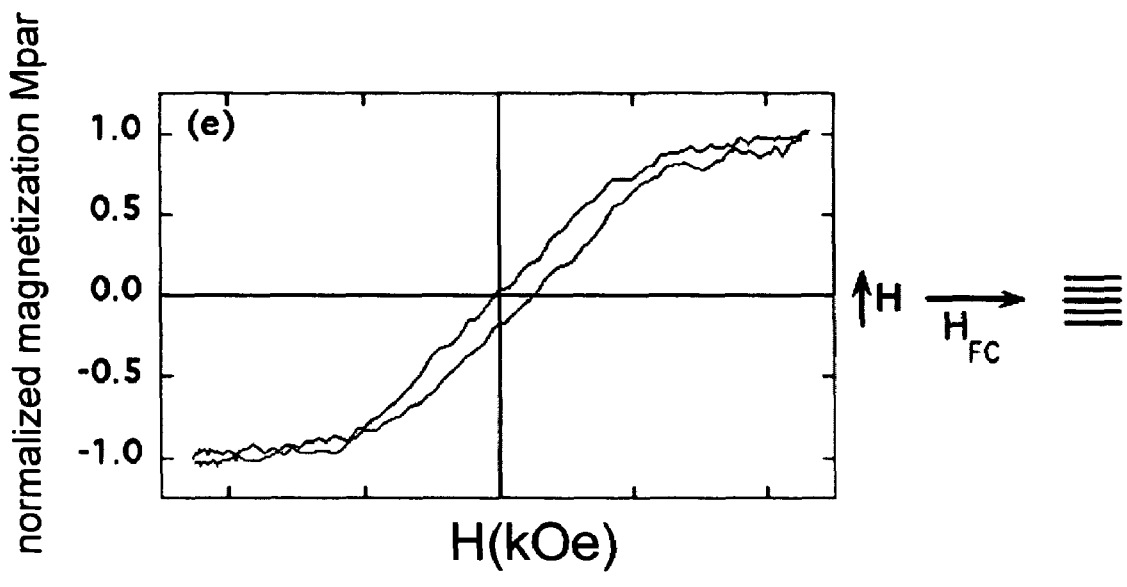
Figure 1F:
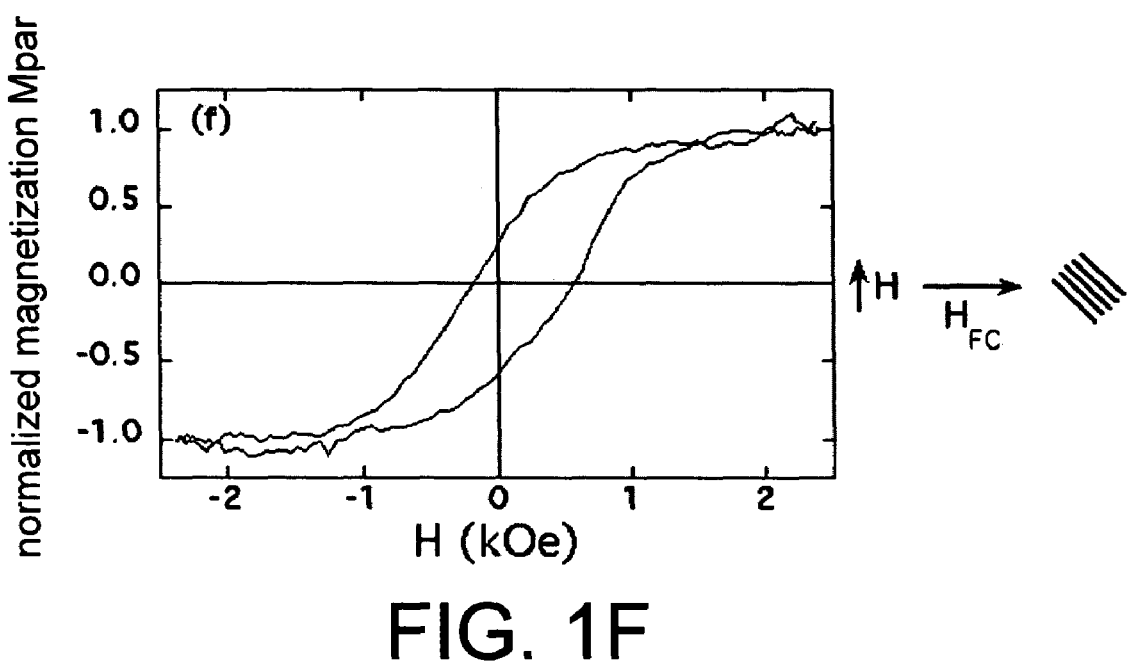
Figure 2A:
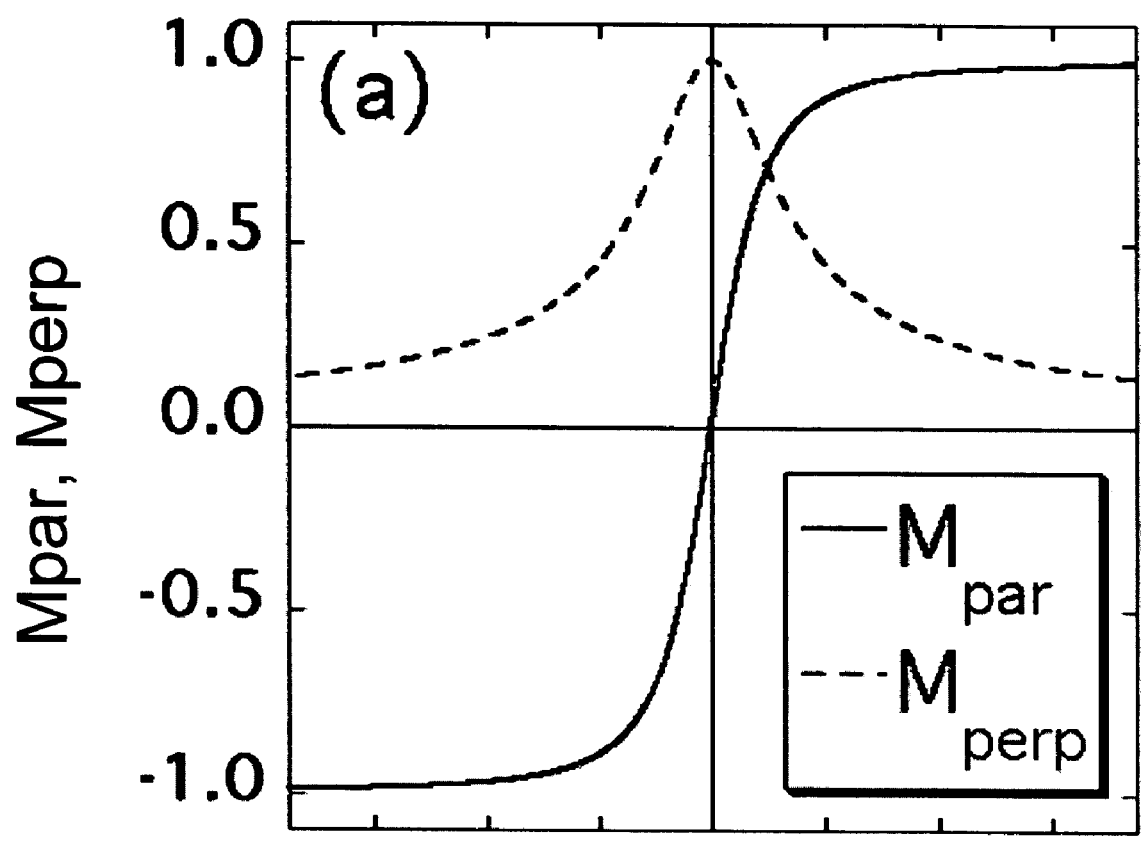
FIGS. 2A, 2B, 2C, and 2D and FIG. 3 illustrate calculated hysteresis loops for a theoretical coherent rotation model.
Figure 2B:
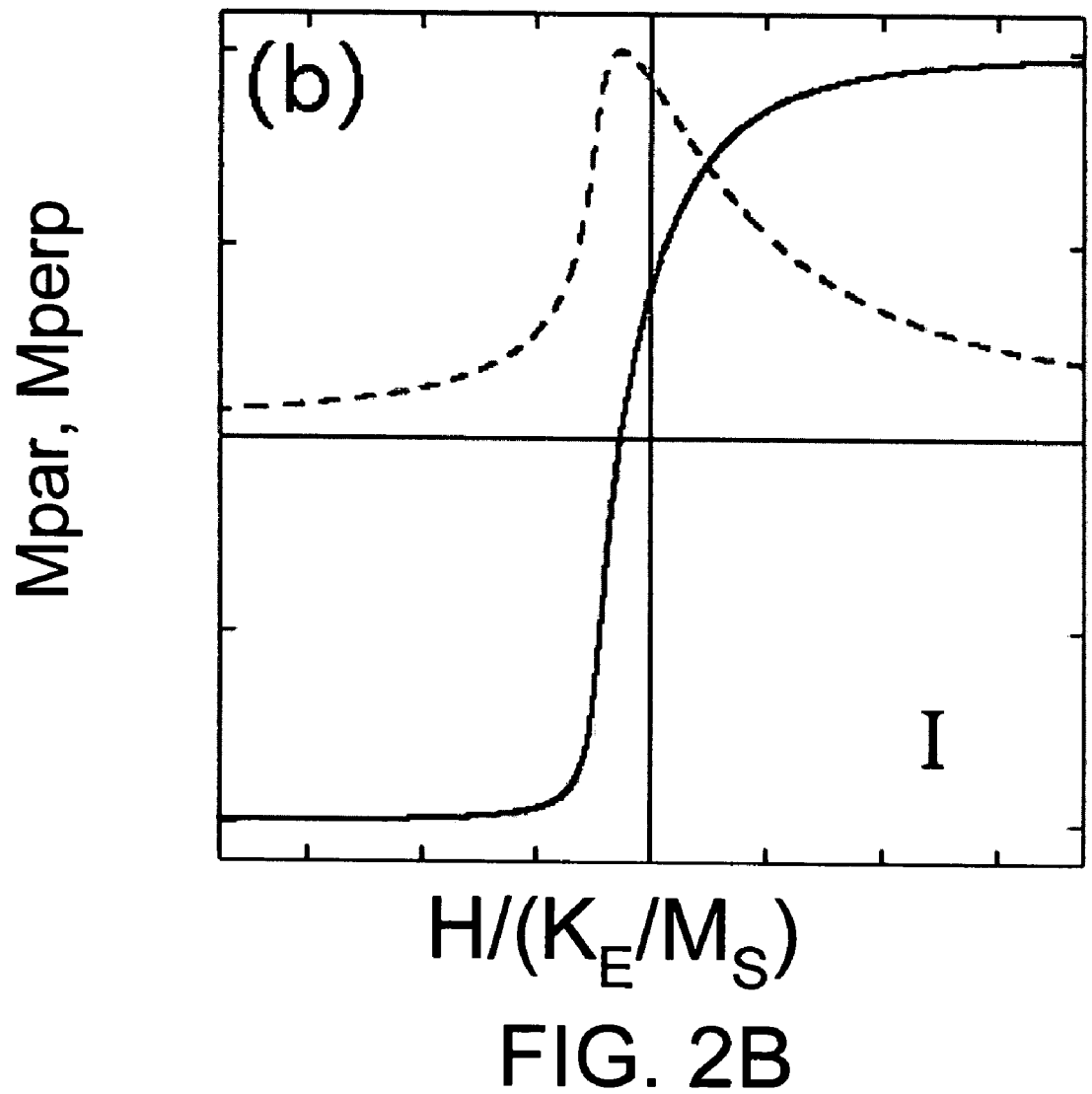
Figure 2C:
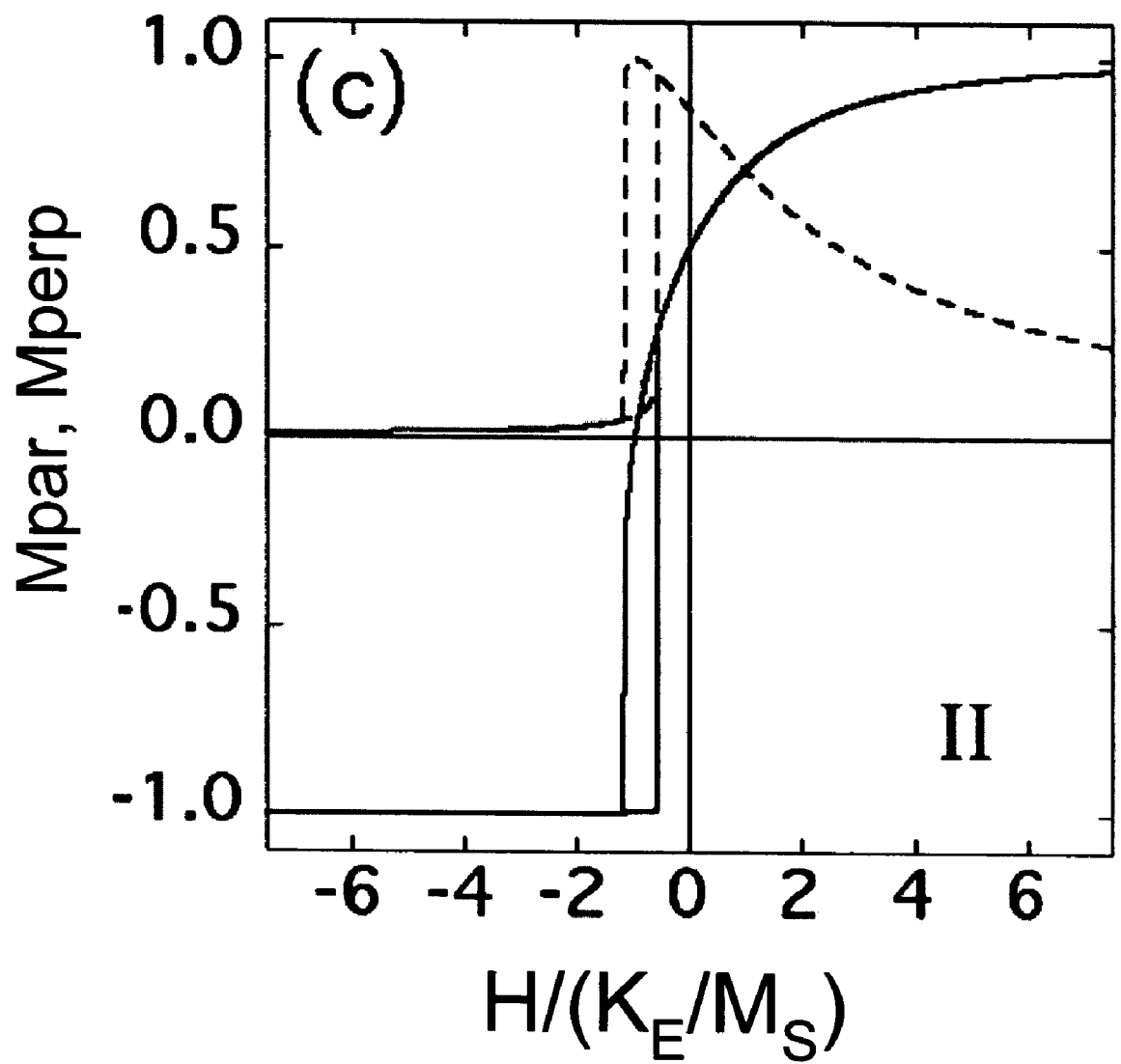
Figure 2D:
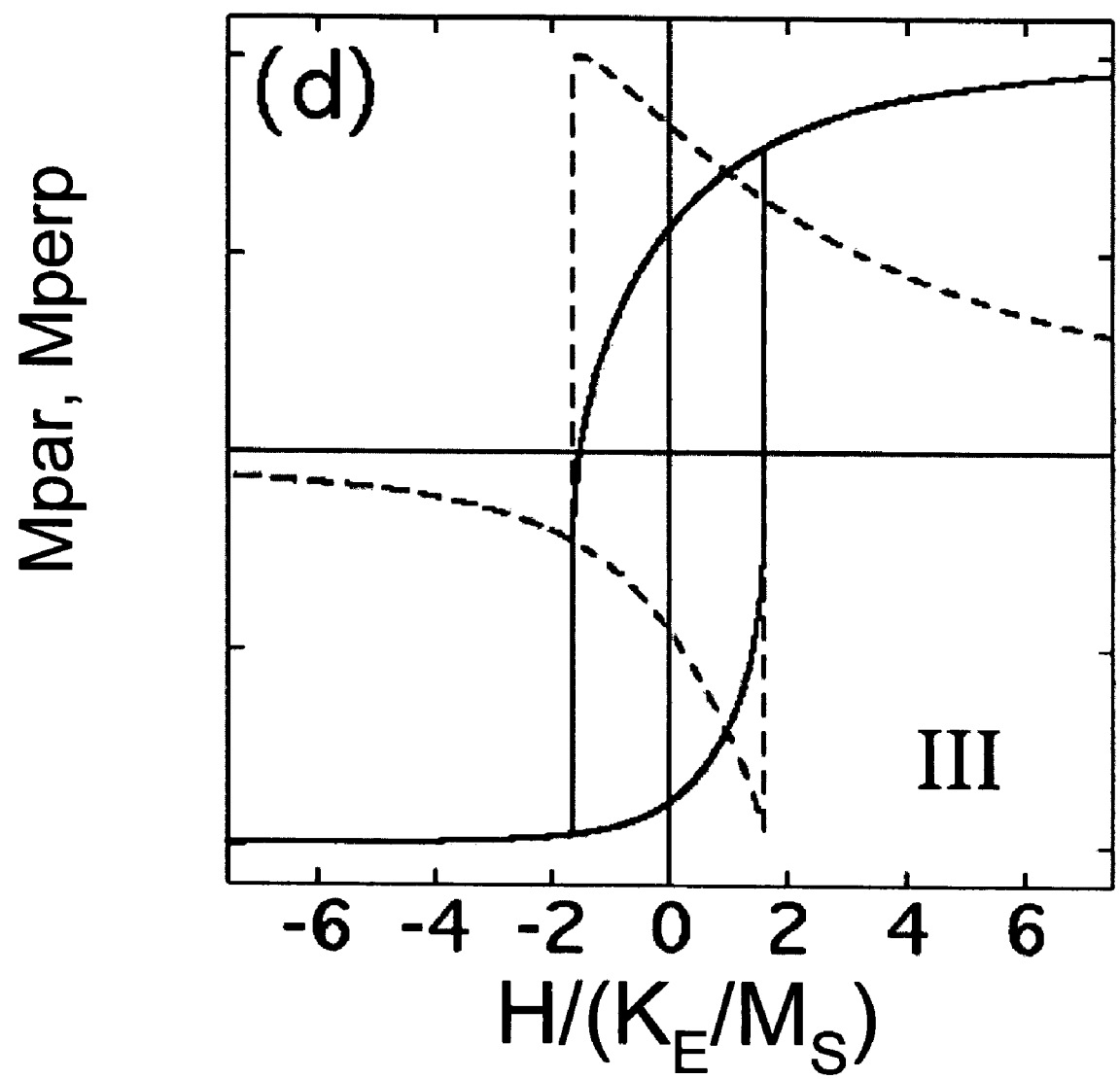

FIGS. 1A-1E show hysteresis loops measured with MOKE at 35 K for three patterns with the lines −45° in FIGS. 1A, 1D, 0° in FIGS. 1B, 1E, and +45° in FIGS. 1C, 1F oriented with respect to the applied field during the hysteresis loop measurements. The applied magnetic field is parallel to the cooling field for in FIGS. 1A-1C, while it is perpendicular for in FIGS. 1D-1F. The directions of the applied field and cooling field with respect to the lines are indicated to the right of each plot.

For measurements in the exchange-biased state, the sample is cooled from room temperature to 35 K in an applied field of 1.5 kOe. FIGS. 1A-1C show magnetic hysteresis loops after field cooling for three patterns with the lines oriented at −45°, 0°, and +45° relative to the cooling and the applied field. The resulting exchange bias is similar (HE ~475 Oe) for all three patterns and only the shape of the hysteresis loop is somewhat changed by the different shape anisotropies. Furthermore, as expected, the hysteresis loops for the patterns rotated +45° or −45° are essentially identical, see FIGS. 1A and 1C.

As shown in FIGS. 1D-1F the situation is completely different as soon as the patterns are rotated 90° clockwise after field cooling. The unidirectional anisotropy is now perpendicular to the applied magnetic field and therefore one would naively not expect to observe any exchange bias. Indeed, for the pattern where the cooling field direction is parallel to the lines and thus along the direction of the uniaxial shape anisotropy, the exchange bias is negligible compared to the other cases, see FIG. 1E. On the other hand, for the lines at 45° to both the applied and the cooling fields, there is an exchange bias, see FIGS. 1D and 1F. However, note that the sign of the exchange bias is opposite for the two orientations, even though the magnetic history is exactly the same.

It is instructive to compare these experimental results with numerical simulations based on a coherent rotation model similar to earlier works. If we assume a homogeneous magnetization in the Fe lines, then the free energy f can be written as:

$$f = HM_s \cos\theta - K_E \cos(\theta-\theta_E) - K_u(\cos^2(\theta-\theta_u)$$

where H is the applied field, $M_s$ is the saturation magnetization, u is the angle of the magnetization with the applied field, $K_E$ and $K_u$ are the unidirectional exchange coupling and the uniaxial shape anisotropy, and $\theta_E$ and $\theta_u$ are the angles between the applied field and these two anisotropy axes, respectively. Hysteresis loops are determined numerically via energy minimization of the above equation. Results are shown in FIGS. 2A-2D for different ratios of $K_U/K_E$ and fixed values of $\theta_u$=90° and $\theta_u$=45°, corresponding to the case in FIG. 1D. As one can see, a range of hysteretic behavior can be observed depending on the ratio $K_U/K_E$.

FIGS. 2A-2D show hysteresis loops from the coherent rotation model with $\theta_E$ and $\theta_u$ fixed to 90° and 45°, respectively. Shown are the longitudinal (solid line) and transverse (dashed line) magnetizations $M_{par}$ and $M_{perp}$ normalized by the saturation magnetization. The curves are for $K_U/K_E$ ratios of 0 in FIG. 2A, 0.3 in FIG. 2B, 0.95 in FIG. 2C, and 1.5 in FIG. 2D. The solid symbols in FIG. 2B indicate the average of the two hysteresis branches from FIG. 1D.

Figure 3:
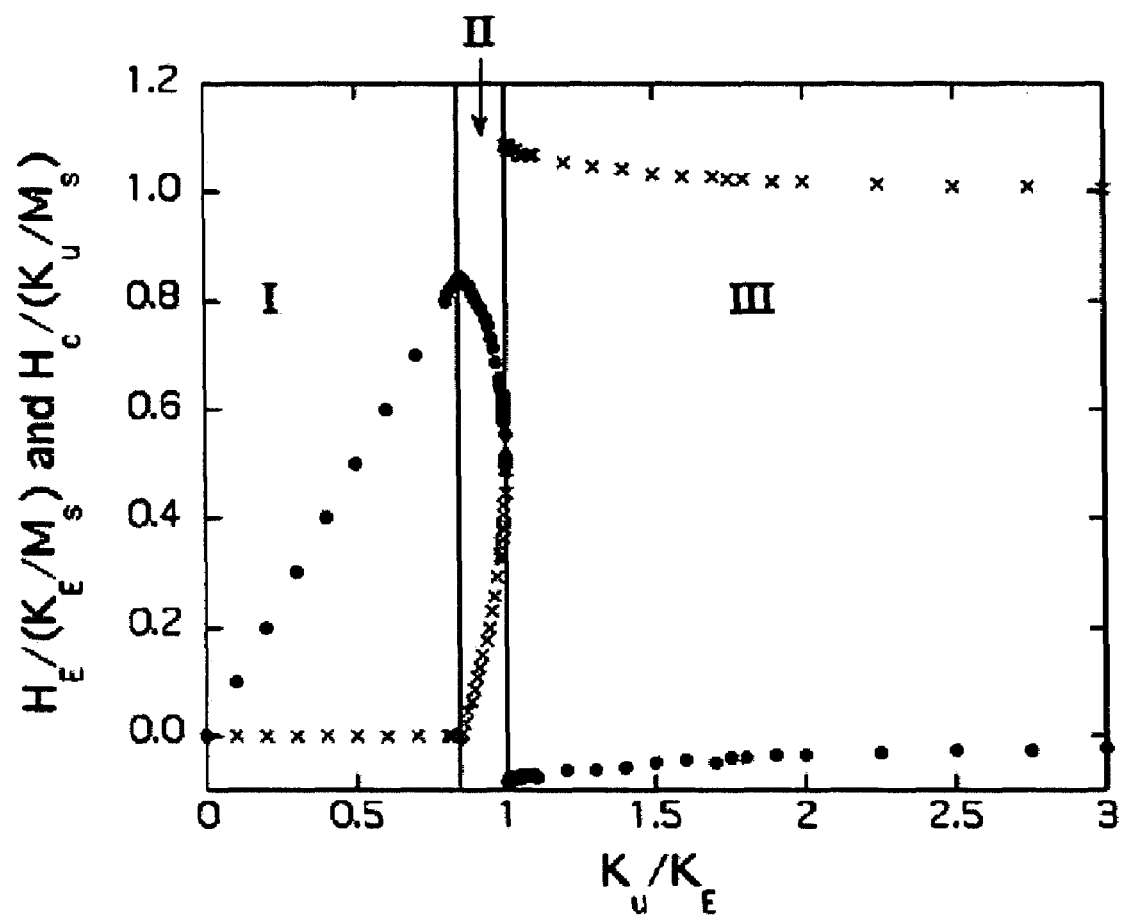

FIG. 3 shows calculated $H_E$ (solid line) and Hc (dashed line) normalized by $K_E/M_s$ and $K_c/M_s$, respectively, as a function of $K_U/K_E$ at fixed $\theta_E=90°$ and $\theta_u=45°$. The regions of different hysteresis behavior are indicated by I, II, and III.

The exchange bias $H_E$ and the coercivity $H_c$ values extracted from these simulated loops are plotted as a function of $K_U/K_E$ in FIG. 3. One can distinguish three types of behavior. For vanishing $K_u$, $H_E$ also vanishes and the magnetization simply rotates reversibly from one direction to the opposite, whereby at remanence the magnetization always points along the unidirectional anisotropy $K_E$, see FIG. 2A. With increasing $K_u$ the magnetization still rotates reversibly, albeit asymmetrically, see FIG. 2B. This gives rise to an $H_E$ which increases linearly with $K_u$ see region I in FIG. 3. When $K_U/K_E$ reaches 0.85, the hysteresis loop shows irreversible behavior, see FIG. 2C. Notice that the exact value at which the irreversible behavior becomes important depends on the angle between the uniaxial and the unidirectional anisotropy. For $K_U/K_E$ larger than 0.85, $H_c$ increases and $H_E$ decreases, see region II in FIG. 3 until they both become close to $K_E/2M_s$ near $K_U/K_E=1$. For $K_U/K_E<1$, the perpendicular component of the magnetization always points along the direction of the unidirectional anisotropy during the magnetization reversal. The situation changes completely at $K_u=K_E$. There is a first-order transition in the hysteretic behavior, such that the magnetization reverses in opposite directions during the ascending and descending branches of the hysteresis loop, see FIG. 2D. At the same time $H_c$ increases by more than a factor of 2, that $H_c>K_U$, and $H_E$ changes sign and is significantly reduced in magnitude. Upon further increasing $K_U$, $H_E$ vanishes, and $H_c$ becomes equal to $K_U$, see region III in FIG. 3 as is expected for a coherent rotation model without additional unidirectional anisotropy.

It is important to realize that the complexity of this magnetic behavior is due to the noncollinearity of the applied field, the unidirectional exchange-coupling anisotropy established by the field cooling, and the shape anisotropy determined by the geometry. For example, if the unidirectional anisotropy is parallel to the applied field, then the exchange bias is independent of the shape anisotropy, namely, $H_E=K_E/M_s$, which is exactly the experimental observation, see FIGS. 1A-1C. It should also be pointed out that the calculated hysteresis loops do not require that the uniaxial anisotropy be due to the shape of the ferromagnet. If the ferromagnet has an intrinsic uniaxial anisotropy (i.e., crystalline) then the same effects should be observable. However, unlike crystalline uniaxial anisotropy, shape anisotropy introduces an extra degree of freedom, since different parts of the same sample can be easily designed to have different magnitude and direction of shape anisotropy.

We can estimate, which region of FIG. 3 corresponds to the samples we measured. The shape anisotropy of the Fe lines can be calculated from demagnetizing factors if one approximates the wires as general ellipsoids. Using $M_s=1740$ emu/cm$^3$ for Fe and the dimensions of 100 mm length, 300 nm width, and 10 nm thickness results in $K_U/M_s=353$ Oe. This compares well with the shape anisotropy determined from room-temperature, hard-axis hysteresis loops, which show an anisotropy field $H_a\sim300$ Oe, corresponding to $K_u/M_s\sim150$ Oe. The unidirectional exchange-coupling anisotropy can be determined directly from measurements with the field applied along the field cooling direction FIGS. 1A-1C and is $K_E/M_s=H_E=475$ Oe. Thus, the samples correspond to region I in FIG. 3. Therefore the exchange bias should be equal to $K_U/M_s$, and in fact the exchange bias in FIGS. 1D and 1F is ±180 Oe, corresponding well to $K_U/M_s=150$ Oe, determined from the room-temperature hysteresis loops. Of course, one may notice that the simulation in FIG. 2B does not show any hysteresis in contrast to the experimental data. This is most likely due to the fact that the model ignores more complicated origins of coercivity in exchange-bias systems, such as irreversible losses in the antiferromagnet. These contributions can be removed from the experimental data by averaging the branches of the two hysteresis loops and the result is shown by the solid symbols in FIG. 2B together with the corresponding numerical simulation. The result is remarkable, since without any free parameter, not only the shift of the loop but also the overall shape of the loop are well described.

In the past, various other approaches have been used successfully to modify exchange bias locally, for example, by ion irradiation. One distinct advantage of the work presented here is that the use of shape anisotropy provides precise control of the magnitude and orientation (i.e., sign) of the exchange bias over a wide range. This means that once the unidirectional exchange-coupling anisotropy is known (i.e., from an unpatterned film), the coherent rotation model can be used to predict quantitatively the resulting exchange bias shifts of the patterned areas.

In summary, it is proven that this new patterning technique can be used to define lateral structures for multilayers resulting in well defined physical properties. In this particular case it is shown that uniaxial shape anisotropy can give rise to exchange bias in situations where one naively would not expect any. Numerical simulations based on a coherent rotation model show that this effect relies on the noncollinearity of the involved anisotropies. The exchange bias is most pronounced when the uniaxial anisotropy is slightly smaller than the unidirectional exchange-bias anisotropy. Furthermore, as a function of the ratio between the uniaxial and the unidirectional anisotropy $K_U/K_E$, the numerical simulations provide a phase diagram with three regions of hysteretic behavior and a change of sign for the exchange bias. Future experiments with varying ratios of $K_U/K_E$ should be able to explore the full range of predicted hysteretic behavior. Furthermore, the directional selectivity of the exchange bias due to shape anisotropy can be used to establish different preferred magnetization directions in separately patterned structures with the same magnetic history. Similarly, one can expect that the competition between shape anisotropy and internal interactions in other types of magnetic heterostructures can give rise to equally rich varieties of magnetic behavior.

In accordance with features of the preferred embodiment, an etch-mask in accordance with the preferred embodiment mimics layers to be patterned for producing a pattern transfer.

Figure 4:
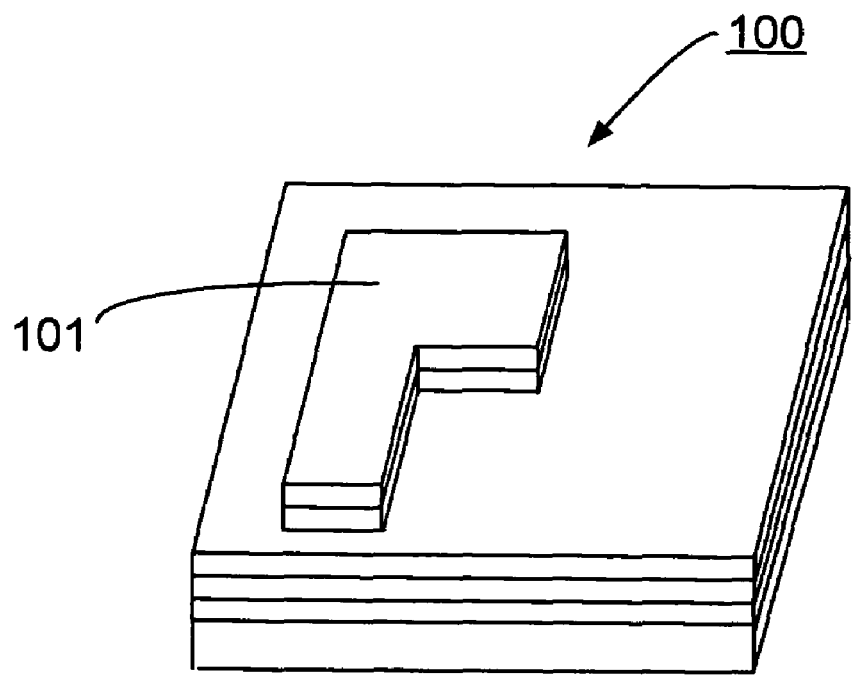
FIG. 4 illustrates an exemplary etch-mask that mimics layers to be patterned for producing a pattern transfer in accordance with the preferred embodiment.
Figure 4:
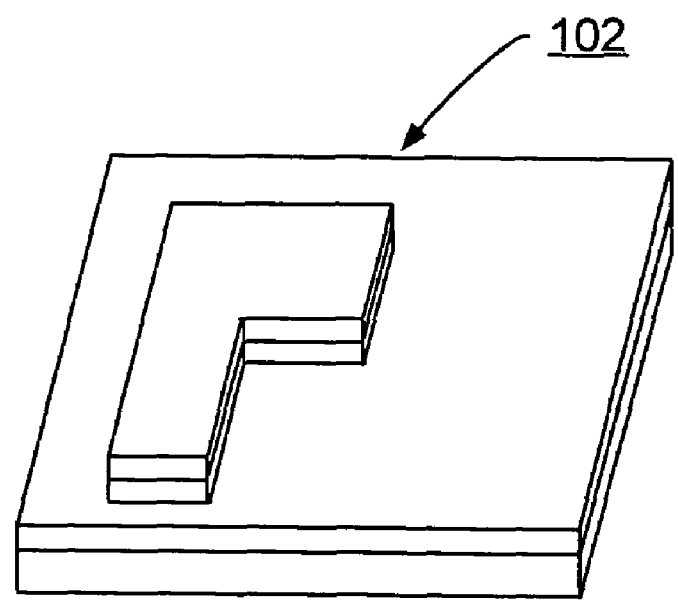

Referring to FIG. 4, there is shown a lift-off step generally designated by the reference character 100 for an exemplary etch-mask 101 that mimics the layers to be patterned in accordance with the preferred embodiment. An etch multilayer step generally designated by the reference character 102 in accordance with the preferred embodiment results in the complete pattern transfer. The etch multilayer step 102 can be an ion-milling operation.

The etch multilayer step 102 for pattern transfer in accordance with the preferred embodiment also removes the etch-mask 101, thus eliminating the need for mask stripping of conventional processes.

Referring now to FIGS. 5-8, there is shown an experimental demonstration of a method for producing a pattern transfer in accordance with the preferred embodiment.

Figure 5:
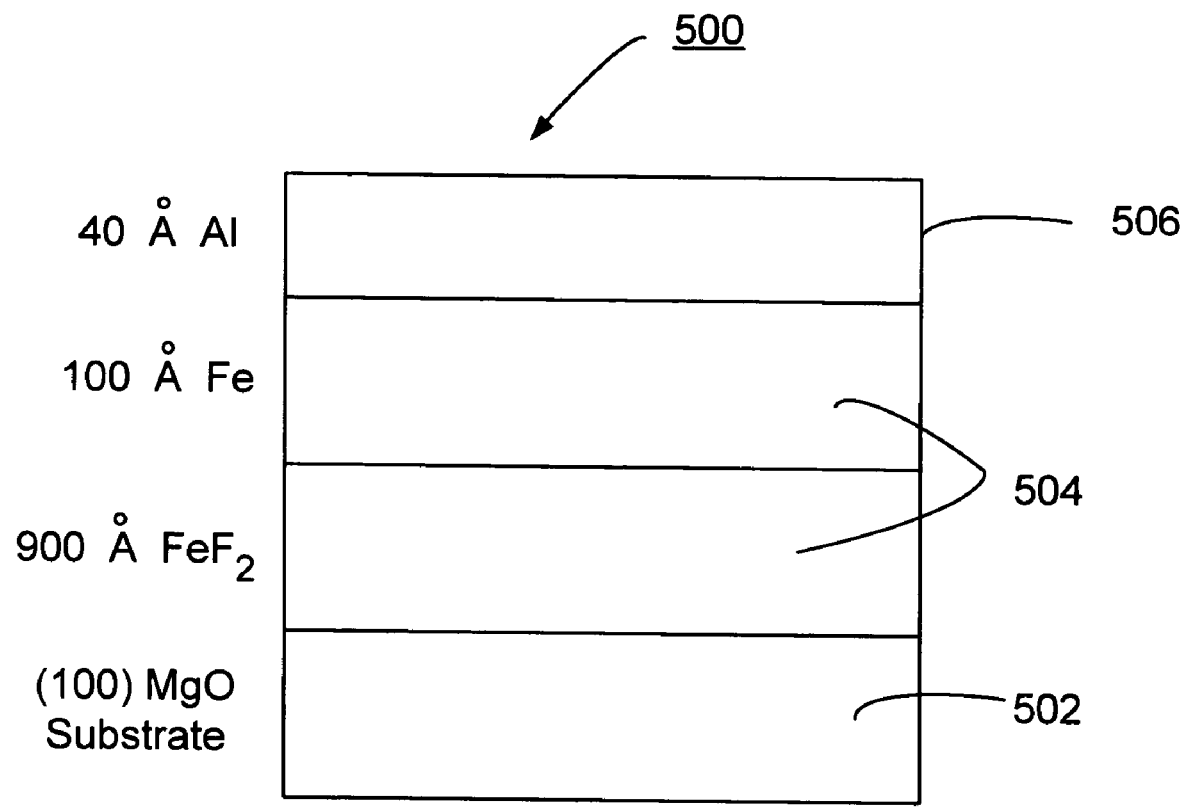
FIGS. 5-8 illustrate an experimental demonstration of a method for producing a pattern transfer in accordance with the preferred embodiment and an exemplary demonstration sample for a vector magnetic field sensor in accordance with the preferred embodiment.

Referring first to FIG. 5, there is shown an initial structure generally designated by the reference character 500 including an MgO substrate(100) 502, Fe/FeF$_2$ bilayers 504, and a Al layer 506. The Fe layer of the Fe/FeF$_2$ bilayers 504 is capped by the Al layer 506 to prevent oxidation of the Fe layer. As shown, the Al layer 206 is 4 nm, the Fe layer is 10 nm and the FeF$_2$ layer is 90 nm.

Figure 6:
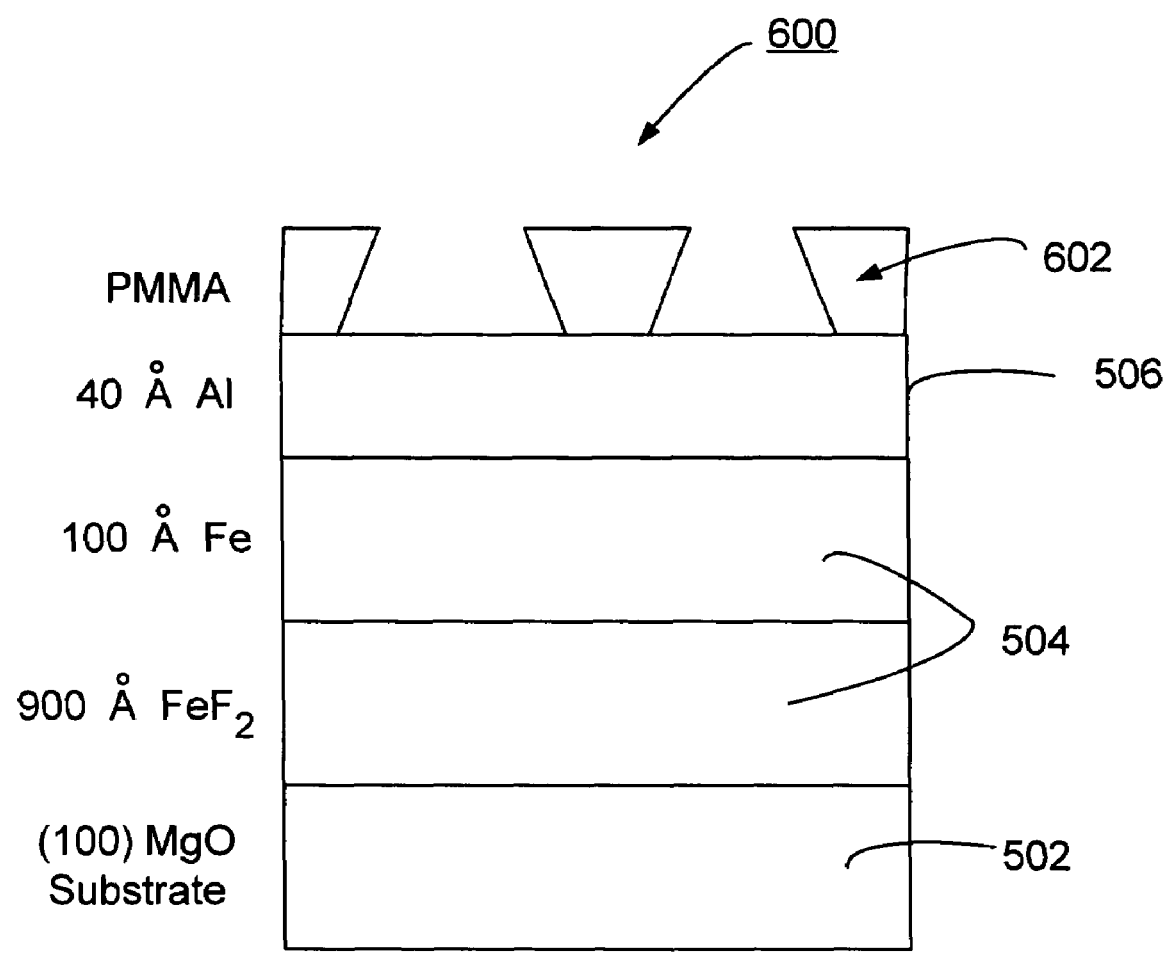

Referring to FIG. 6, there is shown a modified structure generally designated by the reference character 600 including a resist layer 602, such as, a PMMA layer for electron beam lithography that is deposited on the initial structure 500, for example, to define lines having a line width, such as, 180-350 nm and a line pitch, such as, 500 nm and covering an 100×100-μm$^2$ area.

Figure 7:
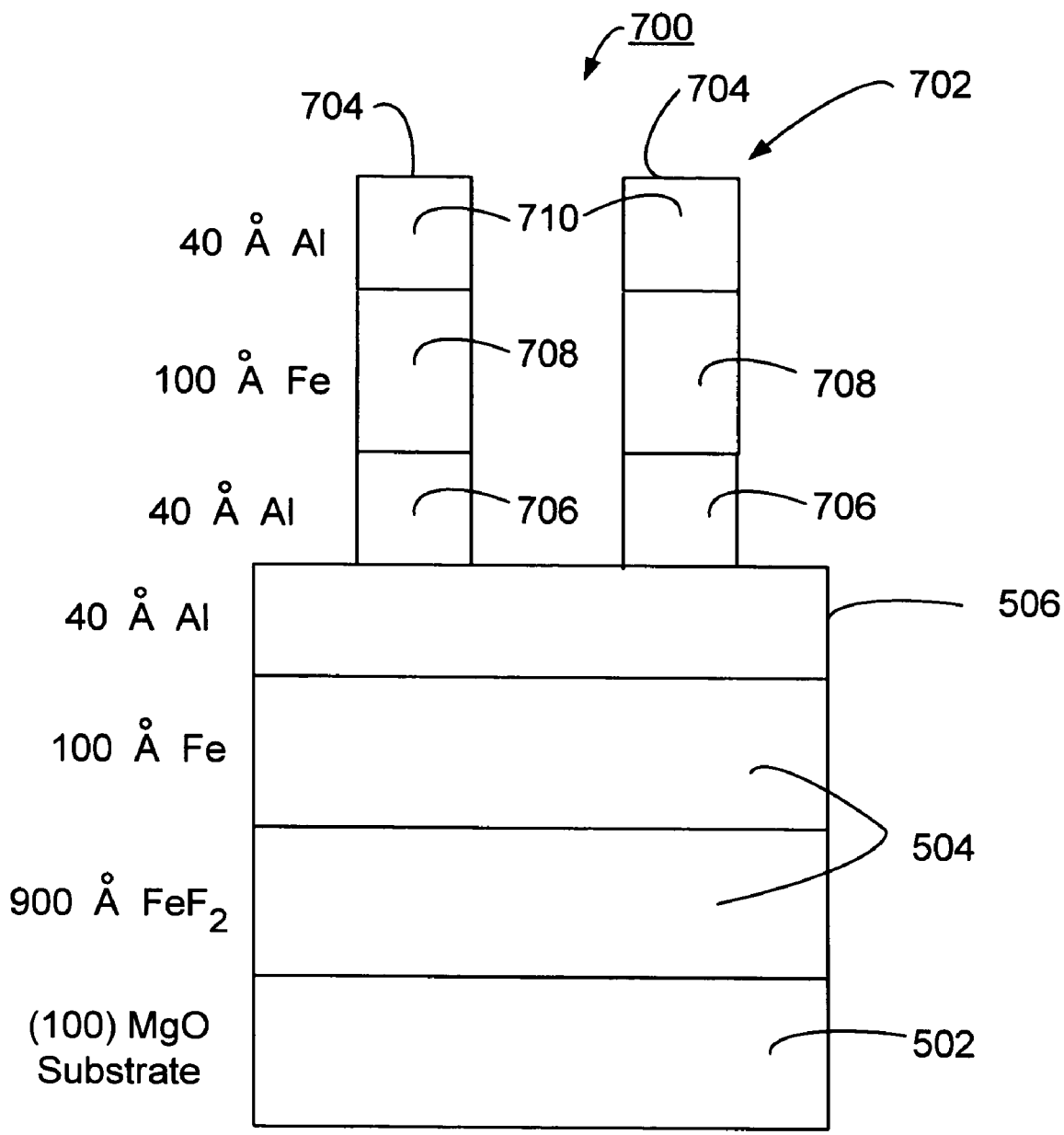

Referring to FIG. 7, there is shown a modified structure generally designated by the reference character 700 for a lift-off step. The modified structure 700 includes an etch-mask 702 that is deposited on the PMMA layer 602 that is removed. The etch-mask 702 includes the same materials as those to be etched. The etch-mask 702 includes an array of lines 704, each line 704 including an Al layer 706 that is 4 nm, a Fe layer 708 that is 10 nm and an Al layer 710 that is 4 nm.

Figure 8:
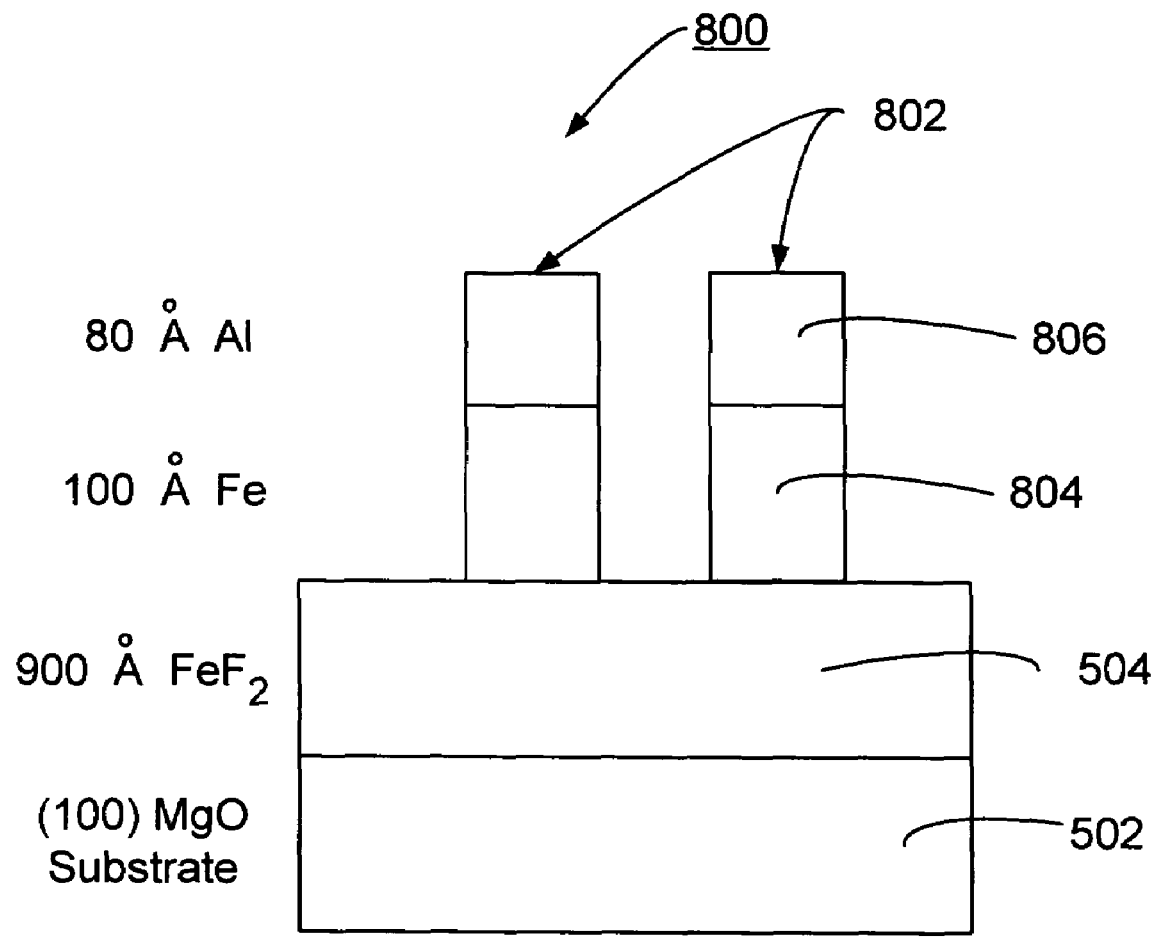

Referring to FIG. 8, there is shown a final structure generally designated by the reference character 800 for the etch multilayer step. The modified final structure 800 includes a pair of lines 802 supported by FeF$_2$ layer of bilayers 504 carried by the MgO (100) substrate 502. Each line 802 including a Fe layer 804 that is 10 nm and an Al layer 806 that is 8 nm, and the FeF$_2$ bilayers 504 is 90 nm.

In accordance with features of the preferred embodiment, different field directions are established on one single chip by using shape anisotropy. In the presented case the patterned systems show still a hysteretic behavior, which would be detrimental for an actual sensor device. Nevertheless, these issues can be easily resolved through a selected combination of ferromagnetic and antiferromagnetic materials. Also the current demonstration is made with materials chosen to answer specific basic science questions. Therefore the exchange bias is only established at low temperatures (<78 K), which is clearly undesirable for practical applications. However an extension of the present idea to room-temperature compatible materials is straightforward.

Figure 9:
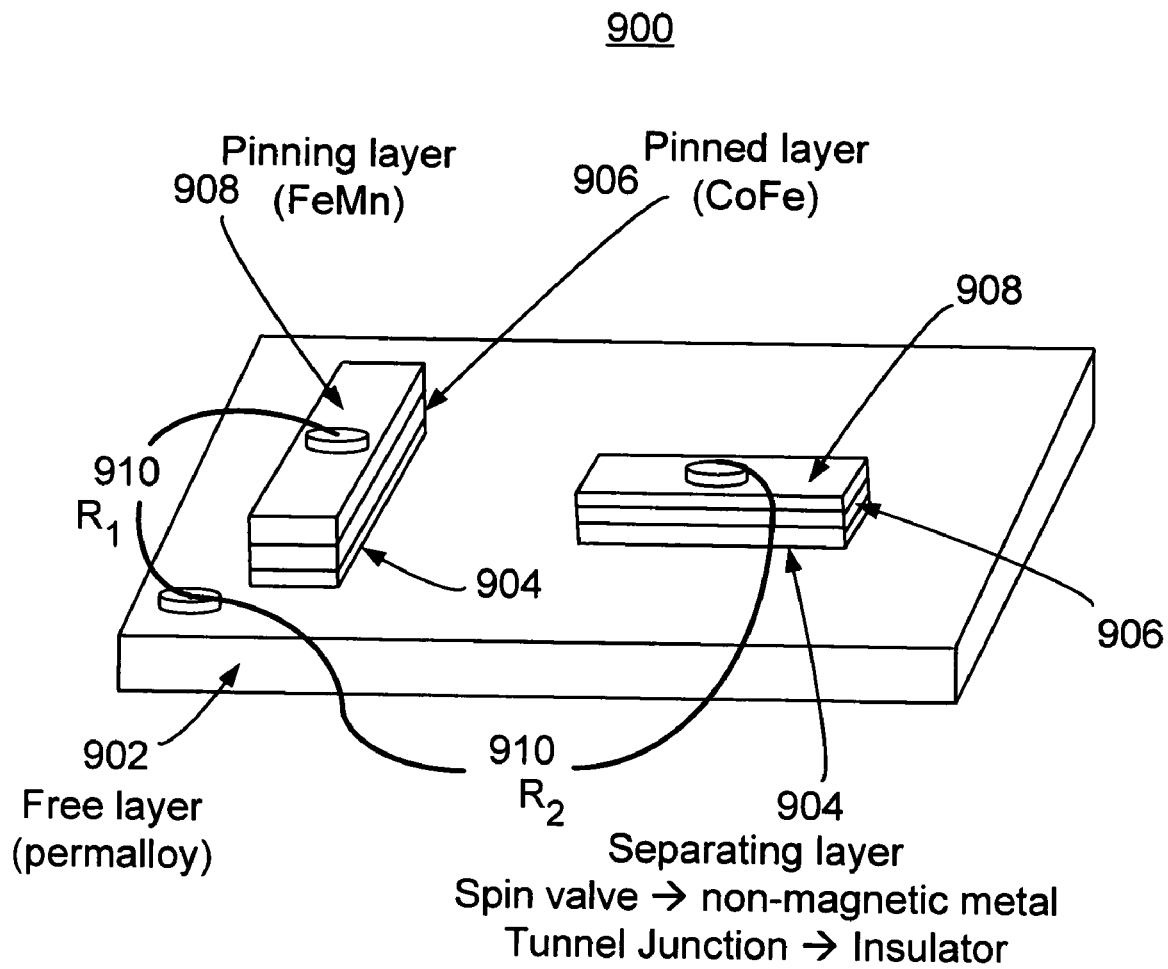
FIG. 9 illustrates an exemplary design for a vector magnetic field sensor in accordance with the preferred embodiment.

Referring now to FIG. 9, there is shown an exemplary design for a vector magnetic field sensor generally designated by the reference character 100 in accordance with the preferred embodiment. Magnetization of a free layer is a vector and while ordinary or conventional spin-valves measure only one component; the vector magnetic field sensor 900 with two reference directions allow measuring orientation of magnetization vector represented as follows:

$$\Delta R_1 \sim \cos(\theta - \theta_1); \text{ and}$$

$$\Delta R_2 \sim \cos(\theta - \theta_2)$$

Exchange bias is established in the vector magnetic field sensor 900 by applying a magnetic field during preparation and annealing after preparation in the magnetic field applied along a direction, which bisects the long axes of the two spin-valves comprising the sensor. Consequently there is one fixed unidirectional anisotropy direction, along the applied magnetic field for the whole sample, that is the single chip defining the vector magnetic field sensor 100. Combined with the shape anisotropy, which is uniaxial and is established by geometry, the unidirectional anisotropy will give rise to two separate reference directions for the pinned magnetization layers in the two sensor components.

The vector magnetic field sensor 900 includes a free layer 902 consisting of a soft ferromagnetic metal, for example, such as a permalloy. The vector magnetic field sensor 900 includes a separating layer 904 between the pinned (906) and free (902) magnetization layer, such as a non-magnetic metal for a spin valve or an insulator for a tunnel junction. The vector magnetic field sensor 900 includes a pinned layer 906 for different field directions consisting of a ferromagnetic metal, such as, a CoFe layer, disposed on the separating layer 904. The vector magnetic field sensor 900 includes a pinning layer 908 for different field directions consisting of an antiferromagnet, such as, a FeMn layer, disposed on the pinned layer 906. A pair of resistances 910 of the vector magnetic field sensor 900 are represented by R$_1$ and R$_2$.

Referring again to FIG. 8, the modified final structure 800 provides an exemplary demonstration sample for a vector magnetic field sensor 900 in accordance with the preferred embodiment. The modified final structure demonstration sample 800 includes the MgO substrate(100) 502, Fe/FeF$_2$ bilayers 504, and Al layer 806. The Fe/FeF$_2$ bilayers 504 capped by the Al layer 806 prevents oxidation of the Fe layer.

While the present invention has been described with reference to the details of the embodiments of the invention shown in the drawing, these details are not intended to limit the scope of the invention as claimed in the appended claims.

What is claimed is:

1. A method for producing a lithographic pattern comprising the steps of:
   using a mask, said mask including a plurality of materials, each said material corresponding to an identical material of a structure to be etched,
   depositing said mask onto said structure to be etched including depositing each said identical material onto said structure to be etched to define a multilayer mask having multiple layers corresponding to said structure to be etched; and
   transferring the pattern and removing said multilayer mask from said structure being etched in one etch multilayer step; said one etch multilayer step implemented independently of etch selectivity characteristics of said structure and said multilayer mask; said one etch multilayer step including identical etch rates for each said corresponding identical material of said structure and mask layer.

2. A method for producing a lithographic pattern as recited in claim 1 includes providing an initial structure of said structure to be etched.

3. A method for producing a lithographic pattern as recited in claim 2 wherein providing said initial structure includes depositing a plurality of materials onto a substrate to provide a selected material thickness for each deposited layer for defining said initial structure.

4. A method for producing a lithographic pattern as recited in claim 3 wherein said multilayer mask includes said identical material having an identical material thickness of said corresponding deposited layer of said initial structure to be etched.

5. A method for producing a lithographic pattern as recited in claim 1 wherein depositing said mask onto said initial structure includes the step of using e-beam lithography for defining lines on said initial structure.

6. A method for producing a lithographic pattern as recited in claim 1 wherein the step of transferring the pattern and removing said mask in one etch multilayer step includes ion-milling said structure and said multilayer mask.

7. A method for producing a lithographic pattern as recited in claim 1 wherein transferring the pattern and removing said multilayer mask includes providing temporal control of an etching process for forming of a desired pattern.

8. A method for producing a lithographic pattern as recited in claim 1 wherein said structure to be etched is a spin valve device and includes the steps of establishing different exchange bias directions by the use of shape anisotropy for an exchange biased component of said spin valve device, eliminating the use of multiple annealing steps.

* * * * *